Patented Dec. 24, 1940

2,225,662

UNITED STATES PATENT OFFICE 2,225,662

METHOD OF PRODUCING HORMONE PREPARATIONS OF HIGH PURITY

Erwin Schwenk, Montclair, N. J., and Friedrich Hildebrandt, Hohen Neuendorf, near Berlin, and Max Gehrke, Birkenwerder, near Berlin, Germany, assignors to Schering Corporation, Bloomfield, N. J., a corporation of New Jersey No Drawing. Original application February 7, 1935, Serial No. 5,400. Divided and this application September 16, 1938, Serial No. 230,198. In Germany October 17, 1931

12 Claims. (Cl. 260—397)

The present invention relates to the isolation of hormone preparations and more particularly to the manufacture of substantially pure sex hormones.

It is a general object of the invention to provide a method for the isolation of the male and female sex hormones, including germinal gland hormones, from complex mixtures of natural and synthetic origin containing the same; and also to provide a method whereby these hormones, and particularly those containing phenolic and alcoholic hydroxyls, may be separated from each other.

The present application is a division of our application Serial No. 5,400, filed February 7, 1935, Patent No. 2,184,775 dated Dec. 26, 1939.

In United States Patent No. 2,046,656 a process for the isolation of pure germinal gland hormones is described which is characterized by the feature that a crude material containing a germinal gland hormone is reacted with a compound of the benzene series capable of condensing with said hormone to form an alkali-soluble ester and having the general formula: X—R—Y, wherein R is a benzene residue, Y is a group which is capable of condensing to form esters with hormones containing alcoholic hydroxyl groups and may be selected from a class consisting of the groups —COCl, —CO.O.CO— and —COOH, while X is a salt-forming group that is, a group serving to make the said ester alkali-soluble; or a group capable of conversion into such a group, such as —COOH, —SO₃H, —OH and —NH₂; said reaction being followed by separation of the resulting alkali-soluble ester, usually by extraction with dilute alkali, saponification and recovery of the purified hormone. By this method, for instance, by fusing of a crude hormone extract with phthalic acid anhydride, the male germinal gland hormone and the female hormone trihydroxy oestrin can each be separated quite readily from its accompanying substances. Instead of phthalic acid anhydride other compounds of similar properties have proved to be suitable for carrying out this process, such as the chlorides of hydroxy carboxylic acids of the aromatic series, for instance, salicylic acid chloride and the like, or phenyl hydrazine sulfonic acids which form condensation products with the keto group present, for instance, in the follicle hormone and the male sex hormone, and the like reagents.

We have found that superior condensing agents for this process are the carboxylic acid sulfochlorides of the general formula:

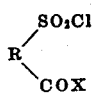

wherein R represents any substituted or non-substituted aliphatic or aromatic radical and X is OH or halogen or other group capable of combining with alcoholic hydroxyl. Such compounds are, for instance, the sulfochlorides of acetic acid, phthalic acid, phenyl acetic acid, toluylic acid, benzoic acids and the like. A very satisfactory reagent is m-benzoic acid sulfochloride, but the other acids may also be used although more by-products which can be saponified only with difficulty are formed with these acids than with said m-sulfochloride benzoic acid.

In order to carry out the process of this invention the carboxylic acid sulfohalide is preferably reacted with the crude hormone preparation to be purified in the presence of a tertiary amine, such as pyridine, quinoline, dimethyl aniline and the like; thereupon, the sulfo carboxylic acid ester formed, having the general formula:

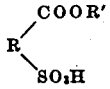

wherein R' is the hormone radical, is precipitated in the form of its salt with the tertiary amine by the addition of an organic solvent immiscible with water, such as benzene, benzine, ether and the like. When using acetic acid sulfo-chloride, the pyridinium salts of the water acids have to be precipitated by means of petroleum ether instead of with ether, for they are somewhat soluble in the latter. Thereby the non-esterified components of the crude hormone preparation remain in solution in said solvent and can be obtained therefrom.

The process described has a number of advantages over the known processes. Thus, it exhibits the known advantages of the esterification with acid chlorides in the presence of a tertiary amine, said advantages consisting in the rapid, practically quantitative reaction without splitting off of water. A further essential advantage consists in the formation of carboxylic acid esters which are capable of being readily saponified. On the other hand the presence of the sulfo-group causes the formation of salts of the amines used, said salts being insoluble in organic solvents. That aqueous solutions are avoided on separating the esterified from the non-esterified compounds, is a further advantage which prevents the formation of soap emulsions and the reciprocative influence on solubility of soap and neutral components. Similar reactions can be obtained with the sulfo-acids of aliphatic acids and of aliphatic acyl halides, i. e. compounds of the general formula

wherein R is an aliphatic residue, and X is hydroxyl or halogen.

A further object of the present invention consists in combining the above described methods or the method of the above mentioned Patent No. 2,046,656 with a method whereby a further subdivision of the esterified and the non-esterified fraction is achieved by treatment with aqueous alkaline solutions of various degrees of alkalinity in the presence of water-immiscible organic solvents. This combination process offers considerable technical advantages over the simple methods. For instance, by dividing crude extracts of the sex hormones by fusing with phthalic acid anhydride into an acid ester fraction which is soluble in sodium carbonate solution, and into a neutral, ether-soluble fraction which contains the unesterified components as well as those which form neutral esters, saponifying these two fractions and extracting the alkaline saponification solution, for instance, subsequently with ether or other water-immiscible solvents in dilute alkali hydroxide, alkali bicarbonate and finally acid solution, a subdivision of the starting material into six fractions is achieved, each of said fractions containing compounds of similar chemical properties. The two fractions obtained by ether extraction of the alkaline saponification liquids can furthermore be subdivided into a phenolic and a neutral fraction by distribution between concentrated alkali and a water-immiscible organic solvent.

By this method of extensive subdivision of the crude hormone preparations the sex hormones present therein are concentrated in the corresponding fractions in accordance with their peculiar and specific chemical properties and are separated from physiologically inactive accompanying substances as well as from chemically different hormones.

Thus, for instance, the male sex hormone due to its alcoholic nature is present in the neutral portions of the acid phthalic acid ester fraction while the follicle hormone is found together with the weak phenols of the so-called non-esterified fractions of the phthalic acid anhydride fused mass. The follicle hormone hydrate of the formula $C_{18}H_{24}O_3$ present in extracts of the urine of pregnant women is of a more strongly phenolic character than the follicle hormone and furthermore possesses two alcoholic hydroxy groups. Hence, it is found together with the strongly phenolic compounds of the acid phthalic acid ester fraction.

Thus, the process described exerts an extraordinarily selective effect and allows, besides separating the max sex hormone from the follicle hormone, also a separation of the various female sex hormones. A further advantage of this combination process consists in the fact that products of high purity are obtained thereby. Especially the female sex hormones can be obtained directly in a pure crystalline state. In contrast hereto, the hitherto known processes require a large number of extractions and crystallizations for obtaining pure products.

The following tables serve to illustrate the invention showing diagrammatically the various steps of the process claimed without, however, limiting the invention to the examples given in these tables.

TABLE I

Starting material: An extract of the urine of male individuals containing besides impurities, male sex hormones, i. e. keto alcohols of the formula $C_{19}H_{30}O_2$ and $C_{19}H_{28}O_2$, its activity corresponding to 5 mg. for the capon unit:

+m-Benzoic acid sulfonic chloride (1-carboxy-3-sulfochloride-benzene) and pyridine poured in ether

↙ ↘

Precipitate consisting of pyridine chlorohydrate, pyridonium salt of m-benzoic acid sulfonic acid and pyridonium salts of compounds of the formula

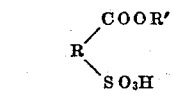

R' representing among others the radical of the male sex hormone. Saponified by KOH.

↓

Saponification solution extracted with ether.

↙ ↘

Alkaline solution containing acids and strong phenolic compounds.   Ethereal solution containing the male sex hormones, other alcoholic and weak phenolic compounds. Extracted with concentrated NaOH

↓

Alkaline solution containing weak phenolic compounds.   Ethereal solution containing alcoholic compounds only, such as the male sex hormone. Evaporated

↓

Purified oily male sex hormones, their activity corresponding to 2 mg. for the capon unit.

Ethereal solution containing impurities only, such as hydrocarbons, ketones and the like.

The extract containing the male sex hormones may be one obtained in known manner by Funk and his collaborators (Amer. Jour. of Physiology, March, 1930, pages 440–449), or according to Gallagher & Koch and their collaborators (Jour. of Biol. Chem. 84, page 495; Proc. of Intern. Congr. for Sex Research, London, 1930, pages 322 and 329).

TABLE II

Starting material: Crude follicle hormone oil obtained from the urine of pregnant mares having an activity of about 300,000 mice units for the gram, containing, for instance, follicle hormones $C_{18}H_{22}O_2$, $C_{18}H_{20}O_2$ and $C_{18}H_{18}O_2$ and other accompanying substances.

Fused with phthalic acid anhydride.
Fused mass poured in water.
↓
Aqueous suspension to which solid sodium carbonate is added. Then mixed with ether and thoroughly shaken
↙ ↘
Sodium carbonate solution to which solid alkali hydroxide is added; saponified.
Ethereal solution. Evaporated and saponified.
↓ ↓
Alkaline saponification liquid diluted with water and thoroughly extracted with ether.
Alkaline saponification liquid diluted with water and thoroughly extracted with ether.
↙ ↘ ↙ ↘
Dilute alkaline solution containing acid and more strongly phenolic components.
Ethereal solution containing the so-called ẟ follicle hormone in a highly purified state.
Dilute alkaline solution containing phthalic acid and more strongly acid phenols than the follicle hormones.
Ethereal solution containing a follicle hormone product having an activity of about 4 to 6 million mice units for the gram.

Table III

Starting material: Crude follicle hormone oil obtained from the urine of pregnant women having an activity of about 100,000 mice units for the gram, containing, for instance, the follicle hormones $C_{18}H_{22}O_2$, follicle hormone hydrate $C_{18}H_{24}O_3$, the male sex hormone $C_{19}H_{30}O_2$, pregnandiol and allo-pregnandiol and other accompanying substances.

Fused with phthalic acid anhydride.
Fused mass poured in water.
↓
Aqueous suspension to which solid sodium carbonate is added, then mixed with ether and thoroughly shaken.
↙ ↘
Sodium carbonate solution, to which solid alkalihydroxide is added; saponified.
Ethereal solution. Evaporated and saponified.
↓ ↓
Alkaline saponification liquid saturated with carbon dioxide, and extracted with ether.
Alkaline saponification liquid saturated with carbon dioxide and extracted with ether.
↙ ↘ ↙ ↘
Sodium bicarbonate solution containing the acid components, mostly phthalic acid.
Ethereal solution extracted with concentrated alkali hydroxide solution.
Sodium bicarbonate solution containing the acid components mostly phthalic acid.
Ethereal solution extracted with concentrated hydroxide solution.
↙ ↘ ↙ ↘
Alkaline solution containing the follicle hormone hydrate 15,000–100,000 mice units for the gram.
Ethereal solution concentrated by evaporation (fractional crystallization).
Alkaline solution containing the follicle hormone, having an activity of 1 to 3 million mice units for the gram.
Ethereal solution containing neutral accompanying substances.
↙ ↘
Mother liquor yielding the male sex hormone.
Crystallized product = pregnandiols.

A more detailed description of the invention is given in the following examples:

Example 1

10 grams of a crude oil obtained by extraction of the urine of male individuals, of which about 5 mg. correspond to one capon unit, are dissolved in 150 cc. of pyridine by heating on the water bath. To this solution 10 grams of m-benzoic acid sulfo chloride (1-carboxy-3-sulfochloride-benzene) are added while stirring vigorously. After 10 minutes the solution obtained is cooled and poured in ether. The precipitate consisting of pyridine chlorohydrate and the pyridonium salts of the esterified and the unreacted sulfo carboxylic acid, is removed by centrifuging, washed in the centrifuge several times with ether, freed of the ether and dissolved in water. Thereupon, 100 cc. of concentrated potassium hydroxide solution are added and the mixture is heated on the water bath until the saponification is completed. The saponification liquid is then extracted with ether, the ethereal solution is freed from phenolic components by repeated extraction with concentrated sodium hydroxide solution and the remaining ethereal solution is washed repeatedly with water and concentrated.

The remaining residue represents a brownish viscous oil having a physiological activity of about 2 mg. for the capon unit. By this method it is possible to separate hydrocarbons and other compounds incapable of forming esters, such as ketones and the like, from the alcoholic or phenolic hormones.

The working-up of the sulfo-carboxylic acid esters and their separation into the individual components may be carried out in any other suitable manner. The esters obtained may even be subjected to the action of phthalic acid anhydride according to the above mentioned patent.

The esters may be saponified in any other manner, for instance, by means of sodium alcoholate or other alkaline agents.

Example 2

A crude hormone preparation obtained from the urine of pregnant mares by means of known methods and having an activity of about 300,000 mice units for the gram, is fused with an equal quantity of phthalic acid anhydride by heating for 6 hours to about 120–140° C. The mass is then diluted with the three- to fourfold quantity of ether and exhaustively extracted by shaking with dilute 10% sodium carbonate solution. Thereby two fractions, an ethereal one and a sodium carbonate solution, are obtained.

The ethereal extract, after evaporating the ether, is saponified by means of 5% methanolic potassium hydroxide. After cooling, the methanolic saponification liquid is highly diluted by the addition of water so as to reduce the alkali concentration to 0.5%, which dilute alkaline solution is thoroughly extracted with ether. The ethereal extract obtained is then repeatedly extracted with 10–15% aqueous potassium hydroxide solution until no precipitation takes place on acidifying a sample of the last alkaline extract. Thereupon the combined alkaline extracts are acidified whereby the follicle hormone precipitates in a finely crystallized form. It can be isolated by filtration or by extraction with ether.

To the sodium carbonate extract obtained from the fused mass and containing the acid phthalic acid esters, solid potassium hydroxide is added until the solution contains 5% of the same, whereupon it is saponified by heating to 90–100° C. After cooling, the saponification liquid is highly diluted with water and thoroughly extracted with ether. Then, the ethereal extract is repeatedly extracted with 10 to 15% potassium hydroxide solution until the entire alkali-soluble material is removed from the ethereal solutions. On acidifying the combined alkaline extracts a resin is precipitated which is purified by taking it up in ether. It contains the ẟ-follicle hormone according to Schwenk and Hildebrandt in a highly purified state.

On using the urine of pregnant women or of male individuals, pregnandiol and the male sex hormones or the male sex hormones respectively are separated on account of their alcoholic nature from the phenolic portion by extracting the ethereal extract from the saponified phthalic acid ester fraction with concentrated alkali hydroxide solution.

By introducing carbonic acid into the dilute alkaline solutions remaining after the separation of the hormones which are extracted with ether further amounts of mostly crystalline products are precipitated and isolated by taking up in ether.

As starting materials there may be used other hormone extracts or preparations, such as those obtained from the urine of pregnant individuals, mares, etc., placenta, ovaries and other organs, from vegetable material, such as palm oil and the like, extracts from coal, mineral oils and similar products and synthetic mixtures as they are obtained, for instance, on oxidation of sterines, and from various other sources, i. e. all mixtures which contain besides compounds of hormone character, physiologically inactive accompanying substances of a different chemical structure.

As will be obvious to those skilled in the art, many variations in the proportions, conditions of reaction, etc., may be made within the scope of the appended claims without departing from the principles of the invention.

Example 3

15 g. of a crude oil obtained by extraction of the urine of male individuals, of which about 5 mg. correspond to one capon unit, are dissolved in 200 ccm. of pyridine by heating on the water bath whereupon 15 g. of p-chlor-benzoic acid-m-sulfo chloride (1-carboxy-3-sulfochloride-4-chloro-benzene) are added while stirring vigorously. After 15 minutes the solution obtained is cooled and poured in ether. The precipitate consisting of pyridine chlorohydrate and the pyridonium salts of the esterified sulfo carbon acid in excess is removed by centrifuging, washed in the centrifuge several times with ether, freed of the ether and dissolved in water. After the addition of 200 ccm. of concentrated potassium hydroxide the mixture is heated on the water bath until the saponification is completed. The saponification liquid is then extracted with ether, the ethereal solution is freed from phenolic components by repeated extraction with concentrated sodium hydroxide solution and the remaining ethereal solution is washed repeatedly with water and concentrated. The remaining residue represents a brownish viscous oil having a physiological activity of about 2 mg. for the capon unit.

By the same method it is possible to carry out the separation of the different hormone-components by converting the mixture with phenyl-acetic acid or acetic acid ester sulfo chloride. As especially suitable for this invention have proved the aromatic m-carbonacid-sulfo chlorides whereby the easily saponifiable carbon acid esters with a free sulfo group are generated.

We claim:

1. A method for the isolation of sexual hormones from complex mixtures containing the same, comprising reacting a crude preparation containing sexual hormones with 1-carboxy-3-sulfochloride benzene, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions so as to divide said fractions into further subfractions containing the individual hormones.

2. A method for the isolation of sexual hormones from complex mixtures containing the same, comprising reacting a crude preparation containing sexual hormones with a compound of the general formula

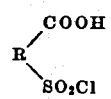

wherein R is a member of the group consisting of aliphatic and aromatic radicals, in the presence of a tertiary amine, precipitating the amine salts of the sulfo carboxylic acid esters formed by the addition of organic solvents wherein the unreacted portions remain dissolved, and isolating the hormone from said precipitate.

3. A method for the isolation of sexual hormones from complex mixtures containing the same, comprising reacting a crude preparation containing sexual hormones with 1-carboxy-3-sulfochloride-benzene in the presence of a tertiary amine, precipitating the amine salts of the sulfo carboxylic acid esters formed by the addition of organic solvents wherein the unreacted portions remain dissolved, and isolating the hormone from said precipitate.

4. A method for the isolation of sexual hormones from complex mixtures containing the same, comprising reacting a crude preparation containing sexual hormones with 1-carboxy-3-sulfochloride-benzene in the presence of pyridine, precipitating the pyridonium salts of the m-sulfo benzoic esters formed by the addition of organic solvents wherein the unreacted portions remain dissolved, and isolating the hormone from said precipitate.

5. A method for the isolation of a male sexual hormone from crude oily extracts obtained from the urine of male individuals and containing such hormone, comprising dissolving said crude oil in a tertiary amine, adding thereto, while heating, a compound of the general formula

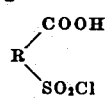

wherein R is an aliphatic or aromatic radical, heating the reaction mixture, cooling the mixture and adding thereto a water-immiscible organic solvent, saponifying the precipitate obtained by means of alkali, extracting the saponification solution by means of an organic water-immiscible solvent, and isolating the male sex hormone from said extract.

6. A method for the isolation of a male sexual hormone from crude oily extracts obtained from the urine of male individuals and containing such hormone, comprising dissolving said crude oil in pyridine, adding thereto, while heating, 1-carboxy-3-sulfochloride benzene, heating the reaction mixture, cooling the mixture and adding thereto ether, saponifying the precipitate obtained by means of alkali, extracting the saponification solution by means of ether, and isolating the male sex hormone from said extract.

7. A method for the isolation of sexual hormones from complex mixtures containing the same, comprising reacting a crude preparation containing sexual hormones with 1-carboxy-3-sulfohalide-benzene, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions so as to divide said fractions into further subfractions containing the individual hormones.

8. A method for the isolation of a male sexual hormone from complex mixtures containing the same, comprising reacting a crude preparation containing such hormone with a compound containing one group capable of condensing with the hydroxy group of said hormone, and another group capable of forming salts, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions, so as to divide said fractions into further subfractions containing the individual hormones.

9. The condensation product of a male sex hormone and a 1-carboxy-3-sulfohalide-benzene.

10. The condensation product of a sexual hormone containing an alcoholic hydroxyl, and a sulfocarboxylic acid of the formula

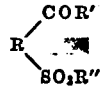

wherein R is a member of the group consisting of aliphatic and aromatic radicals, R' is a hydroxyl group when R is an aromatic radical and is a member of the group consisting of halogen and hydroxyl when R is an aliphatic radical, and R'' is a halogen when R' is hydroxyl and a hydroxyl when R' is a halogen.

11. The condensation product of a male sex hormone containing an alcoholic hydroxyl, and a sulfocarboxylic acid of the formula

wherein R is a member of the group consisting of aliphatic and aromatic radicals, R' is a hydroxyl group when R is an aromatic radical and is a member of the group consisting of halogen and hydroxyl when R is an aliphatic radical, and R'' is a halogen when R' is hydroxyl and a hydroxyl when R' is a halogen.

12. The condensation product of a sexual hormone containing an alcoholic hydroxyl and a sulfocarboxylic acid of the general formula

wherein R is an aliphatic residue.

ERWIN SCHWENK.
FRIEDRICH HILDEBRANDT.
MAX GEHRKE.